United States Patent [19]
Hlousek et al.

[11] Patent Number: 5,488,240
[45] Date of Patent: Jan. 30, 1996

[54] APPARATUS AND METHOD FOR ROTATING AN OPTICAL ELEMENT USING A MOVING COIL IN A CONSTANT MAGNETIC FIELD

[76] Inventors: Louis Hlousek; K. C. Odencrantz; Richard K. Oswald; Donald W. Dahlin; Saied Motaei; Paul W. Siggins; Kenny Wong; Ronald A. Smith; Philip M. Scheinert, all of c/o Thermo Separation Products (California) Inc., P.O. Box 5116, 45757 Northport Loop West, Fremont, Calif. 94537

[21] Appl. No.: 172,899

[22] Filed: Dec. 27, 1993

[51] Int. Cl.⁶ .................................. H01J 31/50
[52] U.S. Cl. ................ 250/231.16; 250/231.17
[58] Field of Search ................. 250/230, 234, 250/237 G, 231.14, 231.16, 231.17; 356/328, 329, 334, 308

[56] References Cited

U.S. PATENT DOCUMENTS

| | | | |
|---|---|---|---|
| 32,075 | 1/1986 | Harrison et al. | 360/77 |
| 2,757,568 | 8/1956 | Fastie | 88/14 |
| 2,837,959 | 6/1958 | Saunderson et al. | 88/14 |
| 2,847,899 | 8/1958 | Walsh | 88/14 |
| 2,868,063 | 1/1959 | Weiss | 88/14 |
| 2,937,561 | 5/1960 | Saunderson et al. | 88/14 |
| 3,056,330 | 10/1962 | Saunderson et al. | 88/14 |
| 3,064,520 | 11/1962 | Saunderson et al. | 88/14 |
| 3,090,278 | 5/1963 | Saunderson | 88/14 |
| 3,163,698 | 12/1964 | Saunderson et al. | 88/14 |
| 3,695,764 | 10/1972 | Delmas et al. | 356/97 |
| 3,704,953 | 12/1972 | Carter et al. | 356/96 |
| 3,809,481 | 5/1974 | Schindler | 356/106 S |
| 3,856,415 | 12/1974 | Sanz et al. | 356/205 |
| 3,868,499 | 2/1975 | Aaronson et al. | 235/151.35 |
| 3,872,407 | 3/1975 | Hughes | 332/7.51 |
| 3,917,407 | 11/1975 | Newstead | 356/97 |
| 3,919,545 | 11/1975 | Schoon | 250/201 |
| 4,070,111 | 1/1978 | Harrick | 356/83 |
| 4,211,486 | 7/1980 | Magnussen, Jr. et al. | 356/328 |
| 4,225,233 | 9/1980 | Ogan | 356/308 |
| 4,264,809 | 4/1981 | Fearnside | 250/201 |
| 4,490,635 | 12/1984 | Harrison et al. | 310/38 |
| 4,669,878 | 6/1987 | Meier | 356/319 |
| 4,732,476 | 3/1988 | Barshad | 356/308 |
| 4,804,266 | 2/1989 | Barshad | 356/308 |
| 4,968,122 | 11/1990 | Hlousek et al. | 350/500 |
| 4,971,439 | 11/1990 | Brown | 356/319 |
| 4,982,296 | 1/1991 | Brown et al. | 360/77.03 |
| 5,231,462 | 7/1993 | Dschen | 356/328 |
| 5,233,405 | 8/1993 | Wildnauer et al. | 356/333 |

FOREIGN PATENT DOCUMENTS 0400946  5/1990  European Pat. Off. .......... G11B 5/60

*Primary Examiner*—David C. Nelms
*Assistant Examiner*—Steven L. Nichols
*Attorney, Agent, or Firm*—Killworth, Gottman, Hagan & Schaeff

[57] ABSTRACT

An apparatus and method for rotating an optical element, such as a diffraction grating or mirror, utilizes a moving coil actuator and an optical encoder to provide precise element position control. The moving coil actuator, which is coupled to the optical element, is comprised of a coil immersed in a magnetic field created by a pair of magnets. Current flowing in the coil windings causes the coil, and ultimately the optical element, to rotate. An optical encoder monitors the rotation of the element and provides rotation signals representative of the instantaneous element position to an actuator control circuit. The actuator control circuit phase shifts the rotation signals and compares the phase shifted rotation signals to a desired reference signal to generate position and velocity error signals. In a track follow mode, the position error signal is applied to the moving coil actuator via a loop compensator. When the apparatus is operating in an optimal seek mode, a trajectory generator receives the velocity error signals and generates an optimum velocity signal based on a preprogrammed velocity curve. The optimum velocity signal is then applied to the moving coil actuator via the loop compensator.

14 Claims, 3 Drawing Sheets

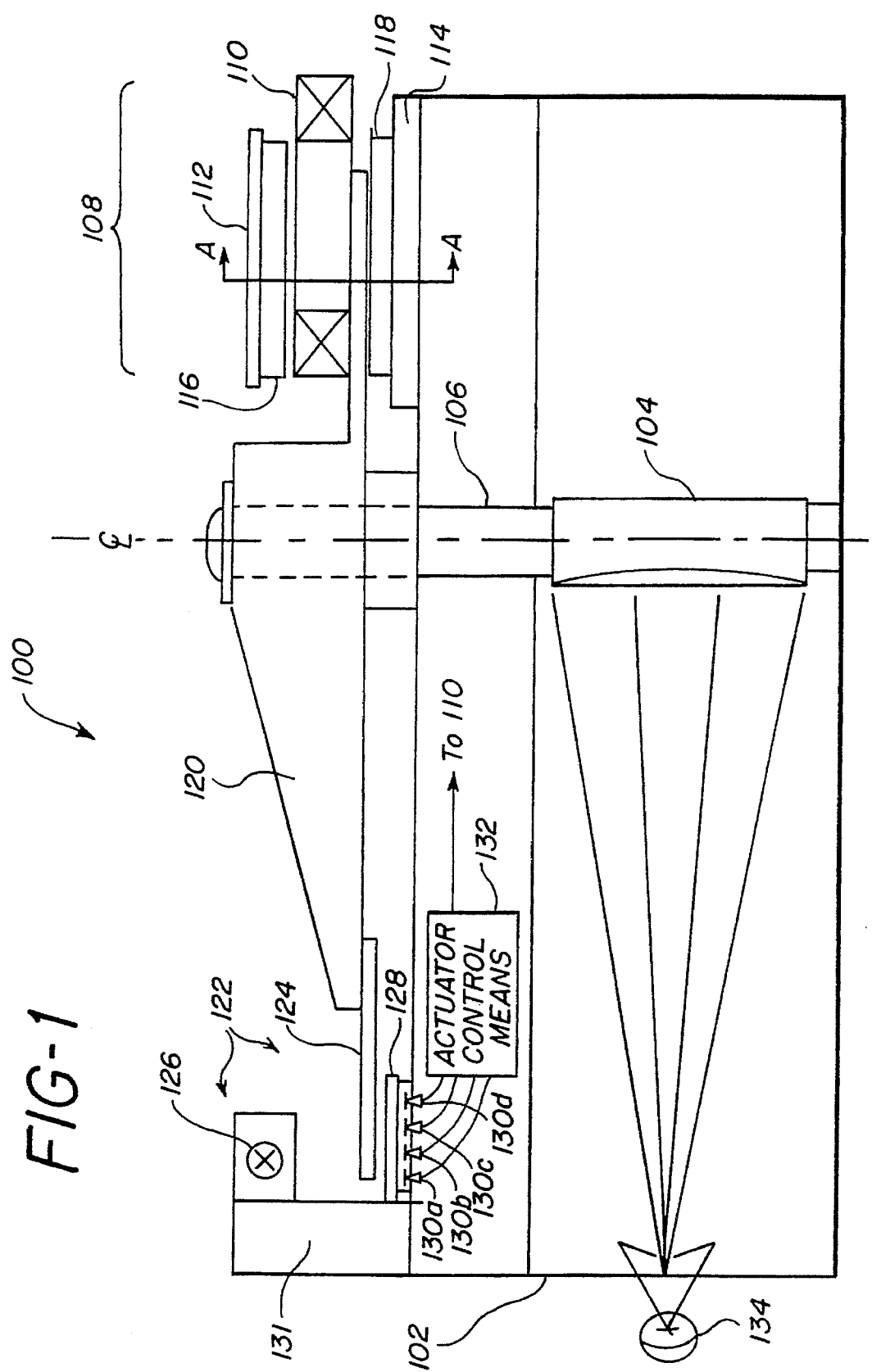

APPARATUS AND METHOD FOR ROTATING AN OPTICAL ELEMENT USING A MOVING COIL IN A CONSTANT MAGNETIC FIELD

BACKGROUND OF THE INVENTION

The present invention relates generally to positioning and scanning mechanisms for driving optical elements, and more particularly to an apparatus and method for rotating an optical element, such as a diffraction grating, to a desired position, to a set of desired positions or over a range of selected positions.

Scientific instruments, such as spectrophotometers used for liquid chromatography or capillary electrophoresis, typically analyze samples by detecting the absorbency (or transparency) or fluorescence of the samples to electromagnetic radiation, such as visible light. The light may be of one or more wavelengths or a band of wavelengths. Generally, the desired wavelengths of light are produced by projecting light, which may be generated by a broadband light source, onto a dispersing element, such as a rotatable diffraction grating of a monochromator. The grating and, possibly, additional optical elements direct the light to the sample or target of interest. The angular displacement of the diffraction grating relative to the incoming light beam can be closely correlated with the individual wavelengths or range of wavelengths at which the sample is to be analyzed. By controlling the angular rotation and position of the diffraction grating, a range of wavelengths can be scanned at a known rate over a known time interval and, consequently, the individual wavelengths can then be distinguished as a function of time.

Prior art monochromators are known which employ a stepper motor or a moving-iron galvanometer to generate and regulate the angular rotation of the diffraction grating. For example, U.S. Pat. No. 4,211,486 issued to Magnussen, Jr. et al. discloses a spectrophotometer utilizing a closed loop servo positioning mechanism to control the angular positioning of the diffraction grating. A feedback control circuit senses changes in capacitance between a rotating diffraction grating armature and a set of fixed electrodes to generate a control signal. The control signal is then compared to a predetermined position setting and the differential error signal is used to control the diffraction grating.

Further prior art systems are known which incorporate position sensing devices for detecting and controlling the angular position of an optical element, such as a diffraction grating. For example, an article by Grenda et al., "Closing the Loop on Galvo Scanners", EOSD Magazine, April 1974 discloses two grating position sensing systems using auxiliary light sources. The first system uses a light emitting diode (LED) to produce a light beam which is reflected by a diffraction grating onto a position sensing silicon photodetector which generates an electrical signal representative of the position of the diffraction grating. A feedback control system uses the generated electrical signal to regulate the angular rotation and position of the diffraction grating.

Grenda et al. also disclose a second position sensing device which uses an auxiliary light source to produce a light beam reflected by the diffraction grating toward a stationary transparent grating. The stationary grating is etched with multiple lines indicating changes in position of the diffraction grating. A photodetector counts the number of light pulses received from the transparent grating to determine the position of the diffraction grating.

U.S. Pat. No. 4,804,266 discloses a rapid-scan spectrophotometer using an optical incremental encoder to control data acquisition and differentiate between wavelengths. A floppy disk drive motor or tape drive motor continuously rotates the grating at a substantially constant velocity. Since the grating is rotated at a substantially constant velocity, wavelengths present in the time intervals between encoder pulses can be determined by interpolation.

The two major operative performance parameters for a scanning mechanism are speed and precision. The prior art systems have experienced problems in providing the necessary speed and precision. Stepper motors have typically been slow and imprecise. Moving-iron galvanometers frequently experience eddy current and magnetic hysteresis causing precision errors. Furthermore, moving-iron galvanometer scanners are very sensitive to ambient conditions. In order to compensate for the above defects, expensive and complex electronic control systems have been designed. Nonetheless, the performance and repeatability of the prior art systems continue to be problems in the art.

Accordingly, the need exists in the art for an improved apparatus and method for rotating an optical element, such as a diffraction grating, which reduces manufacturing costs, provides improved repeatability and precision, and is substantially insensitive to fluctuating ambient conditions.

SUMMARY OF THE INVENTION

The aforementioned need is met by the apparatus and method for rotating an optical element in accordance with the present invention wherein a moving coil actuator and an optical encoder provide precise element control.

In accordance with one aspect of the present invention, an apparatus for rotating an optical element, which may be a diffraction grating or mirror, in response to a light control signal representative of a desired rotation is provided wherein an actuator control means provides an actuator signal to a moving coil actuator to rotate the element. Preferably, means for detecting rotation of the optical element monitors the position of the element and provides the actuator control means with a plurality of rotation signals representative thereof.

Means for detecting rotation of the optical element may comprise an incremental optical encoder including a movable reticle having a plurality of lines thereon indicative of rotation of the element. A light source is positioned adjacent the movable reticle whereby light generated by the light source passes between the plurality of lines onto a fixed reticle. The fixed reticle defines a plurality of encoder apertures indicative of rotation of the element. Light detectors generate rotation signals in response to light from the light source which passes through the plurality of encoder apertures.

The plurality of encoder apertures may preferably include a plurality of first encoder apertures spatially separated along the rotation of the element from a plurality of second encoder apertures whereby the rotation signals are out of phase in proportion to the spatial separation of the first and second encoder apertures.

The fixed reticle preferably includes an intensity aperture for receiving light passing through the movable reticle. A corresponding intensity light detector detects light passing through the intensity aperture and generates an intensity signal representative of light intensity of the light source. The intensity signal is used by the actuator control means to correct for variances in the light intensity of the light source.

To detect a start position from which the operating position of the element is calculated, the movable reticle may include means for defining a movable index aperture. Means for defining a fixed index aperture is provided in the fixed reticle such that the fixed index aperture receives light passing through the movable index aperture when the grating is at the start position. Light passing through the fixed index aperture is detected by an index light detector which generates a start signal indicating that the element is in the start position. The start signal is then used by the actuator control means as a reference in controlling the rotation of the element.

In a preferred embodiment of the present invention, the actuator control means is comprised of a microprocessor and logic circuit which generates a phase shift control signal, a reference signal and a distance-to-go signal indicative of the distance of rotation of the element required to produce the desired rotation. A sine table stores preprogrammed phase shift signals, and, in response to the phase shift control signal, provides a phase shift signal, indicative of the amount of phase shift required, to a phase shifter, preferably a plurality of digital-to-analog converters.

The phase shifted signals are received by a quadrant selector means, including preferably a quadrant selection switch, which compares the phase shifted signals to the reference signal and generates a position error signal based on the comparison. A velocity error signal is also produced as the derivative of the position error signal. A track follow switch provides the position signal directly to a loop compensation means, which provides the appropriate signal damping, when the apparatus is in a track follow mode.

When the apparatus is in an optimal seek mode, a zero crossing detector counts the number of zero crossings which occur in the position error signal. A counter means stores the required distance-to-go zero crossings, or tracks, and decrements the remaining distance-to-go tracks with each detected zero crossing of the position error signal and produces a digital track count signal representative thereof. A track count digital-to-analog converter converts the digital track count signal to an analog track count signal which is applied to a trajectory generator.

The trajectory generator determines the optimum velocity, represented by an optimum velocity signal, for the element from a predetermined trajectory curve based on the remaining distance-to-go tracks. An optimal seek switch, connected between the trajectory generator and the loop compensation means, provides the optimum velocity signal to the loop compensation means.

In accordance with another aspect of the present invention, an apparatus having a rotatable diffraction grating for producing, in response to a light control signal, a wavelength, a set of wavelengths or a range of wavelengths from a light beam is provided. The apparatus includes means for rotating said diffraction grating, an optical encoder for generating a plurality of rotation signals representative of rotation of the grating, and an actuator control means for providing an actuation signal to the means for rotating the diffraction grating to control the grating rotation.

In accordance with yet another aspect of the present invention, a method for rotating an optical element in response to a light control signal indicative of a desired rotation of the optical element comprises the steps of: coupling the optical element to a moving coil actuator; and providing an actuation signal to the moving coil actuator in response to the light control signal to rotate the element whereby the element is rotated to produce the desired rotation. Preferably, the step of coupling the optical element comprises the step of coupling a mirror or a diffraction grating to the moving coil actuator.

The method may include the steps of: generating a plurality of rotation signals representative of rotation of the element; and regulating the actuation signal in response to the plurality of rotation signals and the desired rotation. Preferably, the step of generating a plurality of rotation signals includes the steps of: providing a movable reticle, coupled to the element, having a plurality of lines radially oriented to an axis of rotation of the element; passing light between the plurality of lines; providing a fixed reticle adjacent the movable reticle whereby the light passing through the movable reticle impinges thereon, the fixed reticle defining a plurality of encoder apertures indicative of the rotation of the element; detecting light passing through the plurality of encoder apertures of the fixed reticle; and converting the detected light into the plurality of rotation signals.

The step of regulating the actuation signal may include the steps of: phase shifting the plurality of rotation signals in response to the light control signal; providing a reference signal representative of rotation of the element needed to produce the desired rotation; comparing the phase shifted plurality of rotation signals to the reference signal; and generating the actuation signal in response to the comparison.

It is thus a feature of the present invention to provide an improved apparatus and method for rotating and controlling the position of an optical element by means of a moving coil actuator and an optical encoder.

Other features and advantages of the present invention will be apparent from the following description, the accompanying drawings and the appended claims.

BRIEF DESCRIPTION OF THE DRAWINGS

FIG. 1 is a sectional view of an apparatus for rotating and controlling an optical element, such as a diffraction grating, including a moving coil actuator and an optical encoder in accordance with the present invention;

DETAILED DESCRIPTION OF THE INVENTION

Figure 1A:
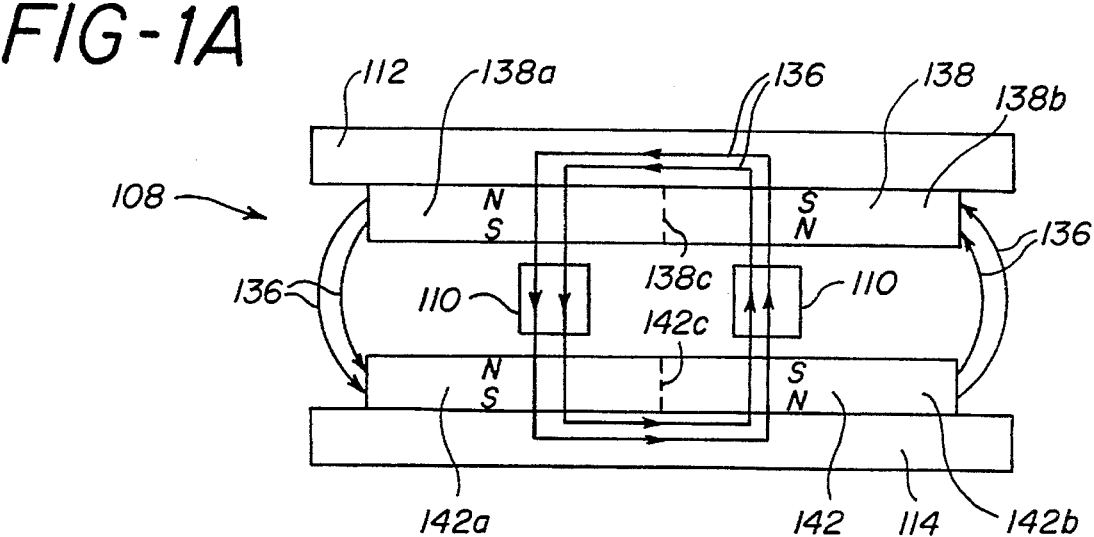
FIG. 1A is a sectional view of the moving coil actuator, taken generally along line A—A in FIG. 1, showing the interaction of a magnetic flux path and the coil in accordance with the present invention.

Referring now to FIG. 1, an apparatus 100, such as a monochromator used in a spectrophotometer, comprises a body 102 and an optical element, such as a diffraction grating 104, coupled to a rotating shaft 106. Means for rotating the optical element, illustrated as a moving coil actuator 108 including a coil 110, a first flux return plate 112, a second flux return plate 114, first magnet means 116 and second magnet means 118, rotates an actuator arm 120 which, in turn, rotates the element 104 via the shaft 106. Preferably, the magnet means 116 and 118 are comprised of permanent magnets, however, any appropriate magnet type may be utilized.

It should be understood that the apparatus and method of the present invention may be used to rotate and control the position of any optical element, for example, a diffraction grating, a mirror, a lens and the like. Each of these optical elements produces a different effect on incident light depending on the position and rotation of the element. The diffraction grating diffracts the light into wavelengths dependent upon the grating position, the mirror reflects the light at angles dependent upon the mirror position and the lens focuses the light dependent upon the lens position. However, for clarity and ease of description the following description of the present invention will be directed mainly to the rotation and control of a diffraction grating.

Movement of the actuator arm 120 is monitored by sensor means which is illustrated as an encoder 122, preferably a resolved incremental optical encoder, including a movable reticle 124 coupled to the actuator arm 120, a light source 126, for example a light emitting diode, a fixed reticle 128, position light detectors 130a and 130b, an intensity light detector 130c and an index light detector 130d. The light detectors 130a–130d may be conventional photodiodes. Although the light source 126 is shown mounted on an external support 131, the light source 126 may be mounted on a printed circuit board.

In response to incident light from the light source 126, position light detectors 130a and 130b generate rotation signals representative of the movement of the grating 104, the intensity light detector 130c generates an intensity signal representative of the intensity of the light source 126 and the index light detector 130d generates an index signal when the grating 104 is in a predetermined start position. The functions of the intensity light detector 130c and the index light detector 130d will be described more fully below with respect to FIGS. 2 and 2A.

Figure 3:
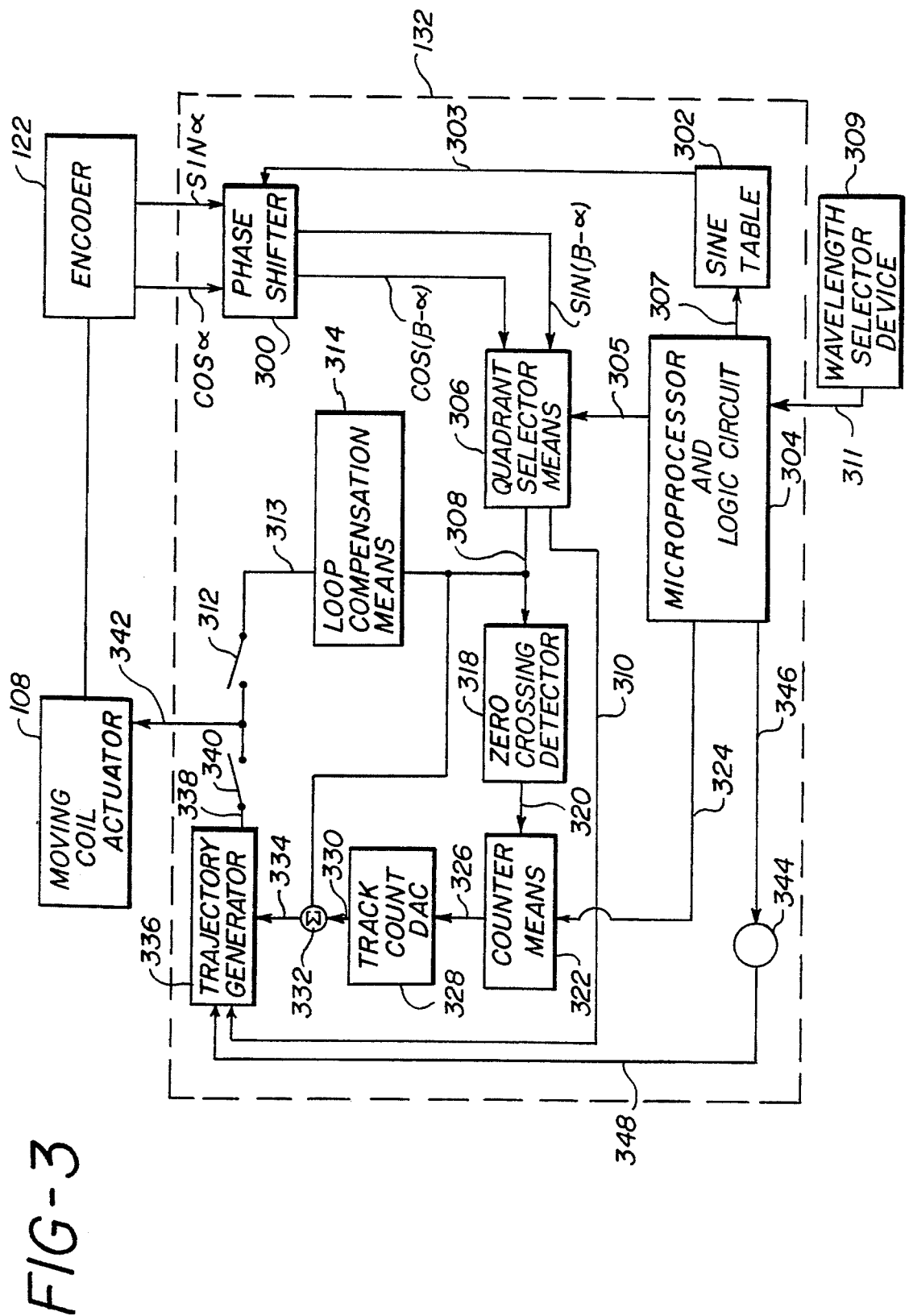
FIG. 3 is a schematic block diagram of the optical element control system of the present invention.

Actuator control means 132, illustrated in more detail in FIG. 3, provides an actuation signal to the moving coil actuator 108 which produces and controls the movement of the coil 110, and ultimately the grating 104, in response to the rotation signals such that the grating 104 is rotated and angularly positioned to reflect light at one or more predetermined wavelengths or a range of wavelengths. A broadband light source (not shown) produces an incident light on the grating 104 which is diffracted by the grating 104 into a sample 134 to be analyzed. As will be apparent to one skilled in the art, the sample 134 may be stationary or changing in time, such as a flowing liquid.

The grating 104 of the apparatus 100 may be rotated to produce diffracted light of one or more individual wavelengths or a range of wavelengths. The apparatus 100 operates in two modes: an optimal seek mode and a track follow mode. In the optimal seek mode, the actuator control means 132 operates in a velocity controlled, point-to-point movement mode. A loop compensator is switched out of the control means 132 and the position of the grating 104 is controlled via a trajectory generator in this mode.

As the grating 104 approaches its destination, the grating velocity approaches zero and the control means 132 becomes unstable in the optimal seek mode. Consequently, it is preferred that the control means 132 be switched to the track follow mode which controls the grating 104 based on position. The grating 104 finishes its rotation, reaches its desired position and remains at the desired position in the track follow mode.

In the track follow mode, the actuator control means 132 operates in a stable, linear control mode. The loop compensator is switched into the control means 132 and the trajectory generator is switched out. Either of the track follow mode and the optimal seek mode may be used to rotate the grating 104 to produce diffracted light of a single wavelength or a set of individual wavelengths.

However, the track follow mode is preferably used when the amount of rotation between desired positions, or wavelengths, is relatively "small". For "small" rotations, the track follow mode provides relatively accurate and rapid movement of the grating 104. Conversely, the optimal seek mode tends to produce less accurate and slower movements of the grating 104 for "short" rotations. In particular, due to fundamental limitations in the apparatus, such as inductance in the coil and the like, the current in the coil cannot be instantaneously changed and, consequently, the grating 104 will typically overshoot the desired position for "small" rotations in the optimal seek mode.

In a three wavelength analysis at 210, 254 and 259 nm, for example, the 210 nm to 254 nm transition would be accomplished in the optimal seek mode and the 254 nm to 259 nm transition would be accomplished in the track follow mode. The return transition from 259 nm to 210 nm would be accomplished in the optimal seek mode. Preferably, any transition which is greater than approximately 6 nm is accomplished in the optimal seek mode. Consequently, for continuously scanning between two positions which produce wavelengths defining the range over which the sample 134 is to be analyzed, the track follow mode is used.

A detailed description of the operation of the apparatus 100 will now be given with reference to FIGS. 1A, 2 and 2A. Upon providing power to the apparatus 100, and upon starting a new scan, the actuator control means 132 produces an initializing current in the coil 110, which is preferably wound in a trapezoidal configuration, to rotate the coil 110 to a predefined start position. The start position is indicated on the movable reticle 124 by a movable index aperture 136 and on the fixed reticle 128 by a fixed index aperture 138.

When the movable index aperture 136 and the fixed index aperture 138 are aligned, light from the light source 126 impinges on the index light detector 130d which generates an index signal in response thereto. In response to the index signal, the actuator control means 132 stops the grating 104 at the start position. As will be apparent to those skilled in the art, various light transparent, reference apertures may be formed in the respective reticles to provide other position indications.

Figure 2:
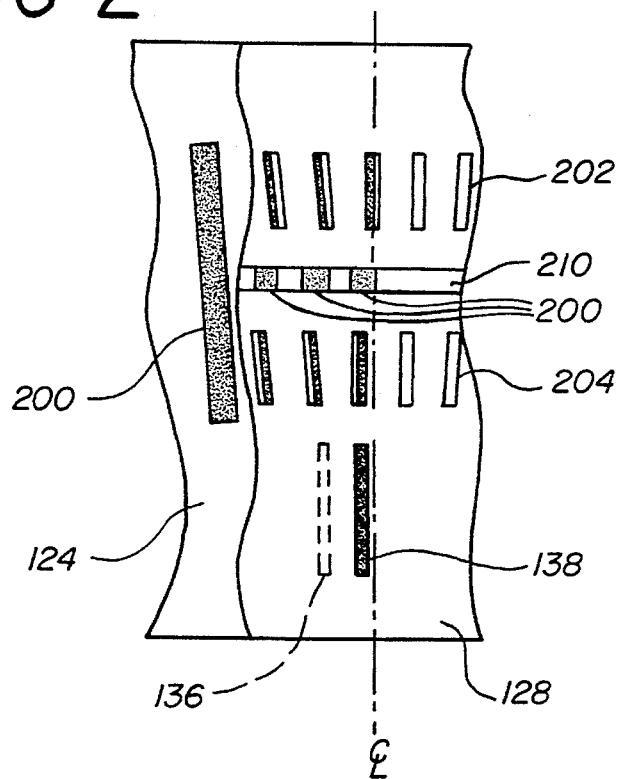
FIG. 2 shows the interrelationship between the movable reticle and the fixed reticle of the optical encoder which monitors the position and rotation of the optical element in accordance with the present invention.
Figure 2A:
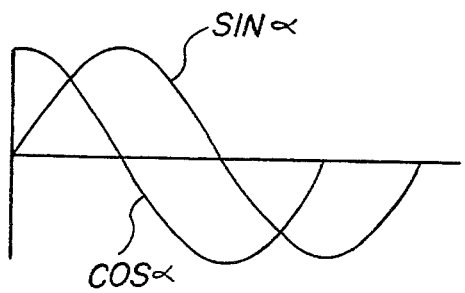
FIG. 2A graphically illustrates the signals generated by the optical encoder representative of the element rotation.

As shown in FIG. 1A, the coil 110 is immersed in a magnetic field, shown as magnetic flux lines 136, and, consequently, flow of the initializing current in the coil 110 causes a force to act on the coil 110, moving the coil 110, and rotating the actuator arm 120. First magnet means 116, comprised of a first magnet 138 including first and second portions 138a and 138b having opposite polarities with respect to each other, and second magnet means 118, comprised of a second magnet 142 including third and fourth portions 142a and 142b having opposite polarities with respect to each other and with respect to their opposing first and second portions 138a and 138b, respectively, produce the magnetic field. First and second magnets 138 and 140 are manufactured, in a well known manner, to have nonmagnetized neutral zones 138c and 142c dividing the respective portions 138a and 138b, 142a and 142b. However, separate nonmagnetic dividers may be utilized to separate the oppositely polarized magnet portions.

When current is passed through the coil 110, the coil 110 will rotate in a direction defined by the direction of the current. Preferably, the coil 110, actuator arm 120 and the movable reticle 124 are balanced on the shaft 106, thereby reducing the force (and current) required to rotate the grating 104 and to hold the grating 104 in a position. After moving the coil 110 to the start position, the actuator control means 132 provides an actuation signal to the moving coil actuator 108 to rotate the grating 104 to or between positions which produce the one or more desired wavelengths or range of wavelengths. The grating 104 moves between wavelengths from its existing position and, therefore, does not have to return to the start position.

During the rotation of the grating 104, the actuator control means 132 continually receives position feedback information regarding the instantaneous position of the grating 104 from the encoder 122. FIG. 2 shows the underside of the fixed reticle 128 as the movable reticle 124 passes above. The movable reticle 128, which is coupled to the actuator arm 120, is provided with a plurality of closely-spaced opaque encoder lines, shown in FIG. 2 at 200, defining light transparent areas which allow light from the light source 126 to impinge upon the fixed reticle 128 as the actuator arm 120 rotates.

The fixed reticle 128 has a plurality of encoder apertures including first encoder apertures 202 and second encoder apertures 204, radially oriented to the direction of the actuator arm 120 rotation. The first encoder apertures 202 and the second encoder apertures 204 are radially offset such that the position light detectors 130a and 130b produce a plurality of rotation signals, such as a pair of out-of-phase sinusoidal signals, shown as sin α and cos α in FIG. 2A. Preferably, the sinusoidal signals have a phase difference of ninety degrees. The method for producing two out-of-phase signals using an optical encoder is well known and will not be further discussed herein.

Additionally, the fixed reticle 128 may contain an intensity aperture 210, which receives light passing through the movable reticle 124, for compensating for any fluctuations in intensity of the light source 126. The intensity light detector 130c detects light passing through the intensity aperture 210 and provides an intensity signal to the actuator control means 132 indicative of any variances in the light intensity of the light source 126. It should be understood that the movable reticle 124 may have a light fluctuation aperture (not shown) which would be aligned with the light intensity aperture 210 in the fixed reticle 126.

Referring now to FIG. 3, the sinusoidal signals sin α and cos α are supplied by the encoder 122 to error means, illustrated as a phase shifter 300, a sine table 302 and quadrant selector means 306, for comparing the instantaneous position of the grating 104 to a desired position, as determined by a microprocessor and logic circuit 304. Phase shifter 300 shifts the phase angles of the respective signals by an amount provided by a sine table 302, such as a conventional EPROM, via a phase shift signals 303 (sin β and cos β). A phase control signal 307, generated by the microprocessor and logic circuit 304, controls operation of the sine table 302. Preferably, the phase shifter 300 is comprised of a pair of dual multiplying digital-to-analog converters.

The microprocessor and logic circuit 304, which may be comprised of a conventional microprocessor, a field programmable gate array and a programmable phase locked loop (PLL) circuit generally consisting of a phase locked loop integrated circuit and a voltage-controlled oscillator, controls the operation of the sine table 302 via phase shift control signal 307 such that the appropriate phase shift occurs based on the rotation of the grating 104 needed to produce the desired one or more wavelengths or range of wavelengths and the instantaneous position of the grating 104. An operator of the apparatus 100 selects the desired element control via a selector device 309. As will be readily apparent to those skilled in the art, the operator may select different variables for different optical elements. For a diffraction grating, for example, the operator may select the desired wavelengths or range of wavelengths to be produced. Alternatively, for a mirror, the operator may select one or more desired angles or a range of angles and a scan rate to direct the light.

The selector device 309, which may be any conventional input device, such as a keypad or switch, produces a light control signal 311 representative of the desired element control. Since the structure and philosophy of the selector device 309 are not important to the present invention beyond the generation of the light control signal 311, details of such devices will not be further disclosed herein.

Based on the light control signal 311, the microprocessor and logic circuit 304 produces a reference signal 305 representative of the desired grating 104, or optical element, position. The quadrant selector means 306 compares the phase shifted signals, shown as sin (β–α) and cos (β–α), to the reference signal 305. A position error signal 308 is generated in proportion to the difference between the reference signal 305 and one of the phase shifted signals determined by the quadrant selector means 306. The phase shifted signal to be used is dependent on the direction of rotation of the grating 104 and is determined by the microprocessor and logic circuit 304. A velocity error signal 310 is generated by taking the derivative of the position error signal 308 in a conventional manner.

In the track follow mode, the apparatus 100 is moving relatively small distances between desired wavelengths or is scanning a range of wavelengths. While scanning a range of wavelengths in the track follow mode, the diffraction grating 104 is rotated between two selected wavelengths and, therefore, the diffracted light includes a range of wavelengths. In order to later distinguish individual wavelengths, the grating 104 must be rotated to produce a constant change in wavelength over time. As is well known, rotating a diffraction grating at a constant angular velocity does not produce a reflected light beam of uniformly changing wavelengths.

The necessary constant rate of change of wavelength, which requires a non-linear rate of change of velocity of the grating 104, is preferably implemented by means of the programmable phase locked loop (PLL) circuit contained in the microprocessor and logic circuit 304. The PLL circuit is programmed by commands from the microprocessor and synchronization signals from the field programmable gate array to provide the velocity control required to produce a constant rate of change of wavelength. As will be readily apparent to those skilled in the art, although the PLL circuit is preferred, other circuits are also suitable for providing a non-linear rate of change of velocity of the grating 104.

The microprocessor and logic circuit 304 initially generates an initialization current to move the grating 104 to the start position. Once the grating 104 is at the start position, the microprocessor and logic circuit 304 determines the direction of rotation of the grating 104 and generates an appropriate actuation signal, via the error means, to begin rotating the grating 104. While the grating 104 is rotating, the microprocessor and logic circuit 304 continuously rotates through the sine table 302 while concomitantly updating the reference signal 305 being supplied to the quadrant selector means 306.

Consequently, the position error signal 308 is continuously produced as the phase shifted signals sin ($\beta-\alpha$) and cos ($\beta-\alpha$)) attempt to duplicate the changing reference signal 305. A conventional loop compensation means 314 which provides proportional-derivative (PD) control for compensating for circuit errors and providing system stability generates a compensated position error signal 313 to the actuator 108 via a track follow switch 312, which is controlled by the microprocessor and logic circuit 304. The microprocessor and logic circuit 304 detects when the grating 104 reaches the end of the wavelength range and reverses the coil 110 by reversing the direction of the coil current. Thus, the coil 110, in response to the position error signal 308, rotates to produce a diffracted light beam having a constant change in wavelength over time throughout the desired wavelength range.

When the apparatus 100 is in the optimal seek mode, it is necessary to rotate the optical element in the shortest possible time for a relatively large move of the grating 104. To accomplish this, a closed-loop control system is used. In the optimal seek mode, the position error signal 308 is provided to a deceleration means which monitors the rotation of the grating 104 and controls the deceleration thereof.

The deceleration means comprises a zero crossing detector 318, counter means 322, a track count digital-to-analog converter 328 and a trajectory generator 336. The zero crossing detector 318 produces a zero crossing signal 320 indicative of the zero crossings of the position error signal 308. From the requested wavelengths and the position of the grating 104, the microprocessor and logic circuit 304 produces a digital distance-to-go signal 324 indicative of the necessary zero crossings (tracks) of the position error signal 308 required before the grating 104 is rotated to the required position. It should be understood that a "track" is the substantially linear portion of the sinusoidal signals sin $\alpha$ and cos $\alpha$.

The counter means 322 stores the number of tracks-to-go and decrements the number of tracks-to-go for each zero crossing detected from the zero crossing signal 320 to produce a digital track count signal 326. The digital track count signal 326 is thus indicative of the number of tracks remaining before the grating 104 is properly positioned. The track count digital-to-analog converter 328 converts the digital track count signal 326 into an analog track count signal 330.

The analog track count signal 330 is combined with a portion of the position error signal 308, shown at summer 332, to form an interpolation signal 334. This combination procedure essentially interpolates between the steps of the analog track count signal 330 to provide a substantially smooth curve for input into the conventional trajectory generator 336, such as the Micro Linear ML4404. The trajectory generator 336 generates a trajectory curve for providing the optimum deceleration velocity based on the distance-to-go of the grating 104. The interpolation signal 334 is indicative of the distance-to-go of the grating 104. The values of resistors (not shown) external to the trajectory generator 336 determine the shape of the trajectory curve and can be, therefore, selected based on the performance characteristics of the grating 104.

Essentially, the trajectory generator 336 allows the grating 104 to accelerate and operate at a controlled velocity which is a function of a velocity transducer and the trajectory generator. Based on the trajectory curve, the trajectory generator 336 monitors the distance-to-go input and determines whether the grating 104 should be decelerating. The trajectory generator 336 then determines the optimum deceleration velocity of the grating 104 for a given distance-to-go along the programmed curve. By regulating the deceleration current supplied to the coil 110, the grating 104 can be gradually decelerated to a stop position.

It should be briefly noted that the trajectory generator 336 has two features which are utilized in the present invention. An "anticipate" feature of the trajectory generator 336 compensates for the delay in reversing the coil current due to coil inductance by reversing the coil current before reaching the trajectory curve. This feature allows the optimal seek mode to operate properly for rotations of about 80 tracks or less in length. Otherwise, the grating 104 would likely overshoot the desired position.

A second feature of the trajectory generator 336 which is utilized in the present invention is the "error average" function. The error average function is used calibrate the trajectory generator 336 such that the output of the generator 336 closely approximates the desired output during deceleration of the grating 104. In essence, the error average function "autocalibrates" the trajectory generator to compensate for deviations in component characteristics.

During autocalibration, the digital potentiometer 344 is initially set to its maximum value which will cause the optimal seek mode to operate at its slowest velocity. The grating 104 is rotated through a calibration move which is preferably a move from 366 nm to 800 nm in the optimal seek mode. The velocity error signal 310 is integrated, or averaged, by a capacitor circuit (not shown) to produce an average error. The sign (+/−) of the average error is latched into an error polarity bit on the trajectory generator via signal 348. The error polarity bit is read by the microprocessor and logic circuit 304. At the maximum setting of the potentiometer 344, the error average will be zero for both directions of the calibration move.

The calibration move is then repeated as the resistance of the potentiometer 344 is incrementally lowered, thereby increasing the rotational velocity of the grating 104. Eventually, the sign of the average error in one of the directions of the calibration move will change to positive (+). The microprocessor and logic circuit 304 records the setting of the potentiometer 344 at the change to positive of the average error.

The potentiometer 344 is continually incremented to a lower resistance until the signs in both directions of the calibration move are positive (+). The microprocessor and logic circuit 304 stops incrementing the potentiometer 344 and records the setting of the potentiometer 344 at this second change to positive of the average error. The microprocessor and logic circuit 304 then sets the potentiometer 344 to the average of the two recorded settings. The "anticipate" and "error average" features of the trajectory generator 336 are fully described in the Data Sheet for the Micro Linear ML4404 trajectory generator and, therefore, will not be further discussed herein.

In response to the interpolation signal 334 and the velocity error signal 310, the trajectory generator 336 produces an optimum velocity signal 338 which is provided to the moving coil actuator 108 via an optimal seek switch 340, controlled by microprocessor and logic circuit 304. The microprocessor and logic circuit 304 controls the optimal seek switch 340 and the track follow switch 312 such that the compensated position error signal 313 or the optimum velocity signal 338 is applied to the actuator 108. The signal 313 or 338 applied to the coil 110 of the actuator 108 comprises an actuation signal 342. A conventional power amplifier (not shown) may amplify the actuation signal 342 provided to the coil 110.

Since the actuator control means 132 continually monitors the grating 104 position, any external or inadvertent displacements of the grating 104 can be corrected. The direction and amount of the inadvertent displacement is detected by the microprocessor and logic means 304 through the out-of-phase sinusoidal signals sin α and cos α. Knowing the direction and amount of the unintended position change, the actuator control means 132 corrects the position via the above discussed procedure.

It should be understood that the components of the actuator control means 132 have been represented in block diagram form in FIG. 3, since they can readily be produced using conventional components by one skilled in the art. To depict or describe them in greater detail would only serve to increase the complexity of the explanation of the actuator control means 132 without adding to its clarity.

Having thus described the apparatus and method of the present invention in detail and by reference to preferred embodiments thereof, it will be apparent that modifications and variations are possible without departing from the scope of the invention defined in the appended claims.

What is claimed is:

1. An apparatus for rotating an optical element in response to a light control signal indicative of a desired rotation of said optical element, said apparatus comprising:

a moving coil actuator, coupled to said optical element, for rotating said element;

sensor means for detecting rotation of said optical element, for generating a plurality of rotation signals representative thereof, and for providing said rotation signals to an actuator control means to control rotation of said optical element; and actuator control means, responsive to said light control signal, for providing an actuation signal to said moving coil actuator to control rotation of said optical element, said actuator control means comprising a microprocessor and logic circuit, responsive to said plurality of rotation signals and said light control signal, for generating a phase shift control signal, for generating a reference signal and for generating a distance-to-go signal indicative of distance of rotation of said element remaining to produce said desired rotation;

error means for phase shifting said plurality of rotation signals and for comparing said phase shifted rotation signals to said reference signal to produce a position error signal and a velocity error signal, said position error signal being provided to said moving coil actuator when said apparatus is in a track follow mode; and deceleration means, responsive to said position and velocity signals, for generating an optimal velocity signal to control said rotation of said element when said apparatus is in an optimal seek mode, said error means comprising a sine table, responsive to said phase shift control signal, for providing a phase shift signal; a phase shifter, responsive to said plurality of rotation signals and said phase shift signal, for generating a plurality of phase shifted signals, said plurality of phase shifted signals being said plurality of rotation signals phase shifted by a phase angle determined by said phase shift signal; and quadrant selector means for comparing said plurality of phase shifted signals and said reference signal, for generating a position error signal based on said comparison and for differentiating said position error signal to produce a velocity error signal.

2. The apparatus as claimed in claim 1 wherein said optical element is a diffraction grating.

3. The apparatus as claimed in claim 1 wherein said optical element is a mirror.

4. The apparatus as claimed in claim 1 wherein said sensor means is an incremental optical encoder.

5. The apparatus as claimed in claim 4 wherein said incremental optical encoder includes:

a movable reticle having a plurality of lines indicative of rotation of said element;

a light source positioned adjacent said movable reticle whereby light generated by said light source passes between said plurality of lines;

a fixed reticle positioned adjacent said encoder apertures whereby light generated by said light source passing between said lines impinges upon said fixed reticle, said fixed reticle having a plurality of encoder apertures indicative of rotation of said element; and a plurality of light detectors for detecting light passing through said plurality of encoder apertures from said light source and for generating a plurality of rotation signals representative of rotation of said element.

6. The apparatus as claimed in claim 5 wherein said fixed reticle includes means for defining an intensity aperture which receives light passing through said movable reticle, and said optical encoder includes an intensity light detector for detecting light passing through said intensity aperture and for generating an intensity signal representative of light intensity of said light source and for providing said intensity signal to said actuator control means to correct for variances in said light intensity of said light source.

7. The apparatus as claimed in claim 5 wherein said movable reticle includes means for defining a movable index aperture, wherein said fixed reticle includes means for defining a fixed index aperture which receives light passing through said movable index aperture, and wherein said plurality of light detectors include an index light detector for detecting light passing through said movable index aperture and said fixed index aperture, for generating a start signal indicating that said element is at a predetermined start position and for transmitting said start signal to said actuator control means.

8. The apparatus as claimed in claim 1 wherein said phase shifter includes a plurality of digital-to-analog converters.

9. The apparatus as claimed in claim 1 wherein said quadrant selector means includes a quadrant selection switch.

10. The apparatus as claimed in claim 1 wherein said deceleration means comprises:

a zero crossing detector, responsive to said position error signal, for generating a zero crossing signal indicative of zero crossings of said position error signal;

counter means, responsive to said zero crossing signal and said distance-to-go signal, for generating a digital track count signal representative of the number of zero crossings remaining to position said element;

a track count digital-to-analog converter for converting said digital track count signal to an analog track count signal; and a trajectory generator, responsive to said analog track count signal, said position error signal and said velocity error signal, for generating said optimum velocity signal.

11. An apparatus having a rotatable diffraction grating for producing, in response to a light control signal, one of a wavelength, a set of wavelengths and a range of wavelengths from a light beam incident to said grating, said apparatus comprising:

means for rotating said diffraction grating;

an encoder for generating a plurality of rotation signals representative of rotation of said diffraction grating; and actuator control means, responsive to said plurality of rotation signals and said light control signal, for providing an actuation signal to said means for rotating said diffraction grating to control said rotation thereof such that said diffraction grating reflects said incident light to produce one of said wavelength, said set of wavelengths and said range of wavelengths, said actuator control means comprising a microprocessor and logic circuit, responsive to said plurality of rotation signals and said light control signal, for generating a phase shift control signal, for generating a reference signal and for generating a distance-to-go signal indicative of distance of rotation of said grating remaining to produce one of said wavelength, said set of wavelengths and said range of wavelengths;

a sine table, responsive to said phase shift control signal, for providing a phase shift signal;

a phase shifter, responsive to said plurality of rotation signals and said phase shift signal, for generating a plurality of phase shifted signals, said plurality of phase shifted signals being said plurality of rotation signals phase shifted by a phase angle determined by said phase shift signal;

quadrant selector means for comparing said plurality of phase shifted signals and said reference signal, for generating a position error signal based on said comparison and for differentiating said position error signal to produce a velocity error signal;

a zero crossing detector, responsive to said position error signal, for generating a zero crossing signal indicative of zero crossings of said position error signal;

counter means, responsive to said zero crossing signal and said distance-to-go signal, for generating a digital track count signal representative of the number of zero crossings remaining to position said grating;

a track count digital-to-analog converter for converting said digital track count signal to an analog track count signal;

a trajectory generator, responsive to said analog track count signal, said position error signal and said velocity error signal, for generating an optimum velocity signal:

loop compensation means, responsive to said velocity signal and said position error signal, for generating said actuation signal;

an optimal seek switch, connected between said trajectory generator and said loop compensation means, for selectively providing said optimum velocity signal to said loop compensation means when said monochromator is in an optimal seek mode; and a track following switch, connected between said quadrant selector means and said loop compensation means, for selectively providing said position signal to said loop compensation means when said apparatus is in a track follow mode.

12. The apparatus as claimed in claim 11 wherein said encoder includes:

a movable reticle, coupled to said grating, defining a plurality of lines radially oriented to an axis of rotation of said diffraction grating and indicative of rotation of said diffraction grating;

a light source positioned adjacent said movable reticle whereby light generated by said light source passes between said lines;

a fixed reticle positioned adjacent said movable reticle whereby light generated by said light source passing between said lines impinges upon said fixed reticle, said fixed reticle defining a plurality of encoder apertures indicative of rotation of said diffraction grating; and a plurality of light detectors for detecting light passing through said fixed reticle from said light source and for generating said plurality of rotation signals representative of rotation of said diffraction grating.

13. The apparatus as claimed in claim 12 wherein said plurality of encoder apertures includes a plurality of first encoder apertures spatially separated along said rotation of said diffraction grating from a plurality of second encoder apertures whereby said plurality of rotation signals are out of phase in proportion to said spatial separation of said first and second encoder apertures.

14. The apparatus as claimed in claim 12 wherein said movable reticle includes means for defining a movable index aperture, said fixed reticle includes means for defining an fixed index aperture which receives light passing through said movable index aperture, and said plurality of light detectors includes an index light detector for detecting light passing through said fixed index aperture, for generating a start signal indicating that said grating is at a predetermined start position, and for transmitting said start signal to said actuator control means.

* * * * *